United States Patent [19]

Cusack, Jr. et al.

[11] Patent Number: 5,020,062
[45] Date of Patent: May 28, 1991

[54] APPARATUS AND METHOD FOR FREQUENCY MODULATING A WAVEGUIDE LASER

[75] Inventors: Francis J. Cusack, Jr., Acton; Clarke E. Harris, Wayland, both of Mass.

[73] Assignee: Raytheon Company, Lexington, Mass.

[21] Appl. No.: 518,610

[22] Filed: May 3, 1990

[51] Int. Cl.$^5$ .......................... G01C 3/08; G01P 3/36; H01S 3/082
[52] U.S. Cl. ...................................... 372/23; 372/28; 356/5
[58] Field of Search ................. 356/5; 372/20, 23, 28, 372/32; 342/87, 122, 127, 130

[56] References Cited

U.S. PATENT DOCUMENTS

| | | | |
|---|---|---|---|
| 4,660,206 | 4/1987 | Halmos et al. | 372/28 |
| 4,666,295 | 5/1987 | Duvall et al. | 356/5 |
| 4,721,385 | 1/1988 | Jelalian et al. | 356/5 |
| 4,812,035 | 3/1989 | Freedman et al. | 356/5 |
| 4,846,571 | 7/1989 | Jelalian et al. | 356/5 |
| 4,895,441 | 1/1990 | Allen | 356/5 |

OTHER PUBLICATIONS

Luzitano, R. D.; "Comparison of Control . . . Laser"; NTIS AD-AO85 707/8, Masters Thesis, 1/80; abst. supplied.
Washwell et al.; "Linear FM-CW Laser Radar . . ."; Electro-Opt. Eng., vol. 572, pp. 133-137, 8/21/85; abst. supplied.
Shotton et al.; "An Electronic Servocontrol . . ."; NTIS N77-29857/8, National Phys. Lab.; abst. supplied.

Primary Examiner—Nelson Moskowitz
Attorney, Agent, or Firm—Christopher L. Maginniss; Richard M. Sharkansky

[57] ABSTRACT

A $CO_2$ waveguide laser frequency modulation (FM) system which applies the Fourier series components of a triangular drive waveform selectively to the tuning PZT at one end of the waveguide and the FM PZT at the other end to achieve an improvement over the waveform than can be achieved by applying the fundamental and its harmonics to the FM PZT alone. The system applies the fundamental component to the tuning PZT and the odd harmonics to the FM PZT. The frequency-separated drive signals are applied in proper phase to the PZT's at each end of the waveguide via waveform synthesizer, frequency splitter and amplifiers. The waveform synthesizer includes a ROM containing digitized values of segments of the waveform amplitudes and a digital-to-analog converter for converting the digital ROM data to an analog signal.

26 Claims, 1 Drawing Sheet

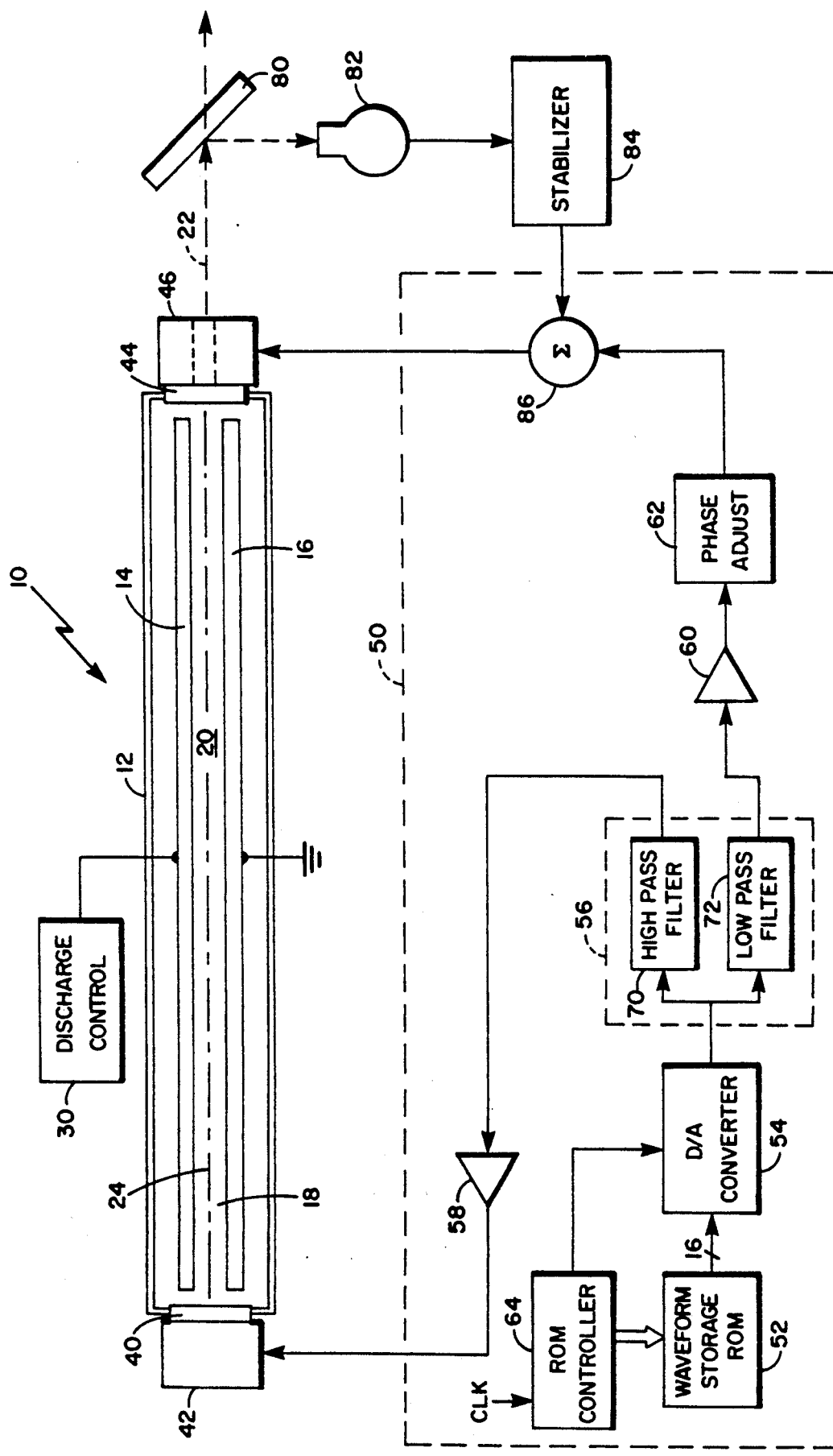

APPARATUS AND METHOD FOR FREQUENCY MODULATING A WAVEGUIDE LASER

BACKGROUND OF THE INVENTION

The present invention relates generally to waveguide lasers and, more particularly, to an apparatus and method for applying modulating signals to piezoelectric transducers at both ends of a waveguide laser cavity to provide increased cavity length modulation.

In a typical gas waveguide laser system, it is known to frequency modulate the energy output from the laser by modulating the length of the laser cavity. The laser output frequency can be expressed as $f = c/2L$, where c is the velocity of light and L is the length of the optical cavity.

In current applications, the cavity length is typically controlled by mounting the mirrors at both ends of the cavity on transducers. The transducers used for this application are crystals which expand or contract a precise distance with an applied voltage. This property is known as the piezoelectric effect, and the crystals are referred to as piezoelectric transducers or PZT's.

In these applications, one of the PZT's is used to frequency stabilize the laser, or in other words, to keep the cavity length constant. This PZT is controlled by servo electronics and protects the cavity length against changes due to thermal or mechanical disturbances. Because this PZT "tunes" the cavity length, it is referred to as the tuning PZT. The tuning PZT has a low bandwidth and a relatively high sensitivity, on the order of nanometers per volt.

The other PZT has a high bandwidth and is used to modulate the cavity length. Since this PZT induces an optical frequency modulation, it is referred to as the FM PZT. The FM PZT throws on the order of hundreds of picometers per volt, i.e., roughly one-tenth the response of the tuning PZT. This frequency modulation is superimposed onto the tuning of the laser cavity. The result is a locked cavity length and therefore a locked laser frequency with a superimposed frequency modulation controlled by the shape and amplitude of the drive waveform input to the FM PZT.

The amount of frequency deviation that can be achieved is limited by the performance of the FM PZT. Present systems are driving the PZT to its maximum voltage and as a result the PZT is behaving in a non-linear manner.

SUMMARY OF THE INVENTION

It is therefore a primary object of the present invention to provide an improved waveguide laser.

It is a further object of the present invention to provide an apparatus and method for increasing the degree to which a gas waveguide laser can be frequency modulated.

It is a still further object of the present invention to provide an apparatus and method for inducing greater cavity length modulation in a gas waveguide laser.

These and other objects of this invention are obtained generally by providing, in a gas laser having a waveguide cavity, the cavity being defined at the ends thereof by movable endpieces, an apparatus for modulating the optical length of the cavity. The apparatus comprises first and second transducers coupled to the movable endpieces, the transducers being responsive to electrical control signals for modulating the positions of the endpieces. The apparatus further includes means for generating a modulation signal and means for separating the modulation signal into a first signal including frequency components greater than a first predetermined cutoff frequency and a second signal including frequency components less than a second predetermined cutoff frequency, the first and second signals being coupled respectively to the first and second transducers.

In accordance with a preferred embodiment of the present invention, there is disclosed a waveguide laser comprising a sealed envelope including a waveguide cavity. The laser also comprises first and second electrodes adjacent the waveguide cavity, means coupled to the first and second electrodes for producing an electrical discharge within the waveguide cavity, and a gain medium within the envelope for emitting coherent radiation in response to the electrical discharge between the electrodes. First and second optical reflectors are positioned at the respective ends of the waveguide cavity, the reflectors being movable so as to modulate the optical length of the cavity. The laser further comprises first and second transducers coupled respectively to the first and second reflectors, the transducers being responsive to electrical control signals for modulating the positions of the reflectors. The laser additionally comprises means for generating a modulation signal and means for separating the modulation signal into a first signal including frequency components greater than a first predetermined cutoff frequency and a second signal including frequency components less than a second predetermined cutoff frequency, the first and second signals being coupled respectively to the first and second transducers.

The present invention is further embodied in a method for modulating the optical length of a waveguide cavity of a gas laser, wherein the cavity is defined at the ends thereof by movable endpieces. The method comprises the steps of: (a) providing first and second transducers coupled to the movable endpieces, the first and second transducers being responsive to electrical control signals for modulating the positions of the endpieces; (b) generating a modulation signal; (c) separating the modulation signal into a first signal including frequency components greater than a first predetermined cutoff frequency and a second signal including frequency components less than a second predetermined cutoff frequency; and (d) coupling the first and second signals, respectively, to the first and second transducers.

With this arrangement, improved operation of a gas laser is provided by increasing the extent to which the waveguide cavity can be linearly modulated. By driving the more responsive PZT with the relatively high amplitude fundamental frequency component of the periodic modulation signal and the less responsive PZT with the relatively low amplitude harmonic frequency components of the periodic modulation signal, greater cavity length modulation can be achieved and therefore higher range resolutions are available for laser radar applications.

BRIEF DESCRIPTION OF THE DRAWINGS

Other features and advantages of the present invention will be more fully understood from the following detailed description of the preferred embodiment, the appended claims, and the accompanying drawings, in which:

The sole FIGURE illustrates a waveguide laser system including cavity length modulating circuitry according to the principles of the present invention.

DESCRIPTION OF THE PREFERRED EMBODIMENT

Referring to the FIGURE, there is illustrated a gas waveguide laser system including a gas laser 10 and circuitry 50 for providing cavity length modulation of the laser cavity. Gas laser 10 includes a sealed envelope 12, which is illustratively fabricated of a ceramic material, and which contains within waveguide section 18 a suitable gain medium 20, which may illustratively comprise carbon dioxide ($CO_2$). Waveguide section 18 is illustratively 24 cm in length and 2 mm on a side in cross section, for a total gas volume within waveguide 18 of approximately one cubic centimeter. Electrodes 14 and 16 are adjacent envelope 12 at the boundaries of waveguide section 18 and on opposite sides therefrom. Electrodes 14 and 16 extend along substantially the entire length of waveguide section 18.

Discharge control circuitry 30 is provided to produce a discharge between electrodes 14 and 16. The discharge excites gain medium 20, thereby producing radiation emission. In a preferred embodiment, discharge control circuit 30 provides a radio frequency (RF) signal through gain medium 20. It should be noted, however, that gain medium 20 may alternatively be excited by a DC signal. Either form of excitation may be employed either in a continuous or pulsed mode of operation.

In the application of the system according to the present invention, laser 10 is used in the resonator mode. Accordingly, a totally reflecting mirror 40 is placed perpendicular to the optic axis 24 of laser 10 at one end of waveguide section 18 and a partially transmitting output mirror 44 is placed perpendicular to optic axis 24 at the opposite end of waveguide section 18. Mirror 40 is mounted on a cylindrical piezoelectric transducer (PZT) 42, and mirror 44 is mounted on a hollow cylindrical PZT 46. PZT's 42 and 46 are responsive to the electrical signals coupled thereto to alter the positions of mirrors 40 and 44, respectively, along optic axis 24 to thereby adjust the cavity length of waveguide section 18.

The prior art practice of using PZT's of different sensitivities at the two ends of envelope 12 is maintained in the present invention. More particularly, in this example PZT 42 corresponds to the FM PZT and PZT 46 corresponds to the tuning PZT. PZT 46 has a low bandwidth, typically up to 20 KHz, and a relatively high sensitivity, while PZT 42 has a high bandwidth but relatively lower sensitivity. By way of illustration, PZT 46 deflects on the order of nanometers per volt of its applied control signal and is substantially linear up to 20 KHz. Also by way of illustration, PZT 42 deflects on the order of hundreds of picometers per volt of its applied control signal, and is substantially linear up to approximately 200 KHz. Practical considerations make it desirable to limit the control signal voltages applied to PZT's 42 and 46 to approximately 300 volts.

The optical beam 22 emitted from laser 10 through partially transmitting output mirror 44 impinges on beamsplitter 80. A small portion of the impingent beam 22 is reflected by beamsplitter 80 into detector 82. Detector 82 produces a signal representative of the frequency of the laser output beam 22 and applies this signal to stabilizer 84 to maintain the frequency stability of laser 10 by controlling the position of partially transmitting output mirror 44 via PZT 46 to thereby adjust the resonant frequency of laser 10 by varying the optical length of its resonant cavity, as is known.

In some applications, stabilizer 84 periodically superimposes a very low frequency signal, typically having a frequency in the order of 1 KHz, on a DC positioning signal applied to PZT 46 by stabilizer 84. This AC signal dithers the position of laser output mirror 44 driven by PZT 46 in order to scan laser 10 about the center of the selected laser transition line (such as the P-20 line), and to generate an error signal to control the amplitude of the DC positioning signal applied to PZT 46. This scanning procedure may be performed periodically during the operation of the system to maintain laser 10 at the center of the selected transition. A commercially available unit, such as a Lansing Research Company Model 80214, may be used as stabilizer 84.

In the illustration of the FIGURE, beamsplitter 80 and detector 82 are shown as dedicated devices, utilized solely for the purpose of measuring the frequency of laser output beam 22 in order to properly control the position of output mirror 44. It will be recognized, however, that beamsplitter 80 and detector 82 may be apparatus included in a local oscillator beam generating and detecting system, such as is described in U.S. Pat. No. 4,812,035, "AM-FM Laser Radar," issued Mar. 14, 1989, to N. Freeman et al., and assigned to the same assignee as the present invention.

In the teachings of the prior art, an FM driver circuit drives the FM PZT (corresponding to PZT 42 in the present invention) to thereby control the position of the end mirror mounted thereto. The FM driver circuit typically comprises a conventional waveform generator responsive to a signal from a system controller to apply a continuous, periodic electrical control signal, which may b, by way of example, a triangular waveform having an up-ramp and down-ramp, to the FM PZT. This PZT responds to a triangular waveform on the control signal by periodically moving the position of the end mirror, thereby continuously changing the optical length of the resonant cavity of the laser from its rest state length in accordance with the shape of the periodic triangular waveform applied to the FM PZT. The laser responds to the movement of this PZT by changing the frequency of the beam produced thereby from the optical frequency by an amount corresponding to the control signal applied to the PZT. Thus, the laser resonates at continuously different frequencies and thus periodically modulates the optical frequency of the beam produced by the laser. In this example of prior art, the frequency of the laser beam is modulated in triangular modulation pattern corresponding to the shape of the waveform produced by the FM driver circuit.

In accordance with the teachings of the present invention, cavity length modulation circuitry 50 includes a storage device 52 for storing information relating to the modulating waveform, a controller 64 for sequencing data out of storage device 52, a waveform synthesizer 54 for converting the information sequenced out of storage device 52 into a continuous electrical signal, a frequency splitter 56 for separating the signal from waveform synthesizer 54 into its high frequency and low frequency components, amplifiers 58 and 60 for boosting the levels of the signals applied to PZT's 42 and 46, a phase shifter 62 for adjusting the relative phases of the frequency-split signals applied to the two PZT's 42 and 46, and a summing device 86 for combining the low frequency portion of the synthesized signal with the cavity length tuning signal from stabilizer 84.

In accordance with the preferred embodiment of the present invention, storage device 52 comprises a read-only memory (ROM) having stored within its addressable memory locations digital representations of the amplitudes of a periodic waveform. More particularly, ROM 52 may be configured as 1K-by-16 (1,024 words of 16 bits per word). With this configuration, and for the case of a triangular waveform of the type described for use in prior art systems, a single period of the waveform may be divided into 1,024 equally-spaced segments, and the memory words may contain 16-bit precision amplitudes of each of these 1,024 segments. A more detailed discussion of the preferred contents of the addressable locations of ROM 52 will be provided in later paragraphs.

In this embodiment, ROM controller 64 comprises circuitry which will provide the interface with ROM 52 capable of properly sequencing the data from ROM 52 into waveform synthesizer 54 which, in the present example, is preferably a digital-to-analog (D/A) converter. The signals of this interface between controller 64 and ROM 52 typically comprise address lines (illustratively ten for addressing the 1,024 words), read enable and strobe lines, and a data ready signal to D/A converter 54 to indicate that the data from ROM 52 is ready to be read.

The function provided by ROM controller 64 is that of generating ROM data sequentially into D/A converter 54. In the preferred embodiment, controller 64 is responsive to an external clock signal (CLK) to generate a progressively incrementing stream of addressing signals such that the 1,024 memory locations of ROM 52 are sequentially addressed according to the sequence: ... 0, 1, 2, ..., 1022, 1023, 0, 1, .... In this way, a continuous stream of digital data is provided from ROM 52 to D/A converter 54, the stream being periodic for every 1,024 occurrences of the CLK signal. The design details of ROM controller 64 are dependent on its interface with ROM 52 and are well understood by those skilled in the art to which it pertains.

The sixteen data output signals from the ROM 52 are applied to D/A converter 54. At every instance, these digital signals comprise a binary representation of the instantaneous amplitude of the desired waveform. As the data are clocked into D/A converter 54 from ROM 52 via a strobe signal from controller 64, an analog signal closely approximating the desired waveform is output from D/A converter 54. Converter 54 may additionally include filtering to smooth the step transitions of the D/A output.

The analog output signal from D/A converter 54 is applied to a frequency splitter 56, which preferably comprises a high pass filter 70 and a low pass filter 72 coupled together at their inputs. Filters 70 and 72 divide the output signal from converter 54 into high frequency components and low frequency components, respectively, wherein each filter 70, 72 has substantially the same cut-off frequency so that each frequency component of the composite input signal is passed by either high pass filter 70 or by low pass filter 72, but not by both.

The composite signal including the higher frequency components, provided at the output port of high pass filter 70, is coupled to the input port of amplifier 58. Amplifier 58 is preferably a power amplifier having a voltage gain in the order of 300 and providing a voltage swing at its output terminal of 300 volts.

The composite signal including the lower frequency components, which may, in fact, include only the fundamental frequency component, which signal is provided at the output port of low pass filter 72, is coupled to the input port of amplifier 60. Amplifier 60 is preferably a power amplifier and may be substantially similar to amplifier 58, with the exception that it does not require as high a bandwidth.

The signal at output port of amplifier 60 is coupled to a circuit 62 for adjusting the phase of the signal applied thereto. Phase adjusting circuit 62 allows the phasing of the lower frequency composite signal from amplifier 60 to be shifted relative to the higher frequency composite signal from amplifier 58. Phase adjustments may be required to compensate for unequal propagation times in the higher and lower frequency branches of cavity length modulation circuitry 50, particularly between high pass filter 70 and low pass filter 72 which may impart different phase shifts to their respective signals. Phase adjusting circuit 62 typically includes a variable capacitance, and its design will be well understood by those in the art to which it pertains.

It will also be recognized by those skilled in the art that phase adjusting circuitry 62 may be located in positions other than that shown in the FIGURE. That is, phase adjustment may occur at any place in either or both of the paths between low pass filter 72 and PZT 46 and between high pass filter 70 and PZT 42. Alternatively, where the phase relationship between the signals applied to PZT's 42 and 46, in the absence of a phase adjusting circuit 62, is uniform and determinable, the appropriate phase shift may be incorporated within the data programmed into ROM 52, thereby obviating the need for an external phase adjustment.

Summing device 86 combines the DC (or very low frequency) mirror positioning signal from stabilizer 84 with the output signal from phase adjusting circuit 62, the combined signal from summing device 86 being applied to PZT 46 as its drive signal.

The preferred embodiment has been described for the example where the modulating signal, generated by D/A converter 54 and applied to PZT's 42 and 46, has a triangular waveform. For this case, the memory locations of waveform storage ROM 52 would contain the digitized values of, illustratively, 1,024 amplitudes of a perfect triangular waveform spanning a single period. In the theoretically ideal situation, the synthesized waveform would comprise the Fourier series of an infinite number of frequency components. Using Fourier analysis, it is known to express a triangular waveform having amplitude normalized to 1.0 and being periodic in time multiples of $2\pi$ as:

$$f(t) = (8/\pi^2)\sin t - (8/9\pi^2)\sin 3t + (8/25\pi^2)\sin 5t - (8/49\pi^2)\sin 7t + (8/81\pi^2)\sin 9t - \ldots$$

Thus, it is seen that this triangular waveform includes only the odd harmonics of the sine terms having the following normalized amplitudes:

| | | | |
|---|---|---|---|
| $A_1$ | (fundamental) | = | 0.81057 |
| $A_3$ | (3rd harmonic) | = | 0.09006 |
| $A_5$ | (5th harmonic) | = | 0.03242 |
| $A_7$ | (7th harmonic) | = | 0.01654 |
| $A_9$ | (9th harmonic) | = | 0.01001 |

| | | | |
|---|---|---|---|
| $A_{11}$ | (11th harmonic) | = | 0.00670 |
| $A_{13}$ | (13th harmonic) | = | 0.00480 |
| $A_{15}$ | (15th harmonic) | = | 0.00360 |
| ... etc. | | | |

Therefore, in the ideal case, ROM 52 is programmed with a sequence of values which, when synthesized by A/D converter 54, spectrally split by splitter 56 and applied to PZT's 42 and 46, provides deflections of mirrors 40 and 44 such that the amplitudes of the spectral components of the deflections are proportional to the above values for $A_i$.

In the present example, the frequency of the triangular waveform is 20 KHz. Thus, for a fundamental frequency of 20 KHz, the third harmonic is 60 KHz, the fifth harmonic is 100 KHz, the seventh harmonic is 140 KHZ, the ninth harmonic is 180 KHz, the eleventh harmonic is 220 KHz, etc. However, as was noted earlier, tuning PZT 46 has a very limited bandwidth (less than 20 KHz) and FM PZT 42 is linear only up to approximately 200 KHz. Therefore, in this example, the synthesized waveform must be limited to the fundamental frequency and the third, fifth, seventh and ninth harmonics, in order to maintain the PZT's in their linear range. Furthermore, because of the low bandwidth and high sensitivity of tuning PZT 46, only the fundamental frequency component is directed to PZT 46, and a composite signal comprising the third, fifth, seventh and ninth harmonics is directed to the higher bandwidth, less sensitive FM PZT 42.

In order to achieve the spectral separation described in the preceding paragraph, the cutoff frequencies for filters 70 and 72 are selected to be between the fundamental frequency, 20 KHz in the present example, and the third harmonic, 60 KHz in the present example. Illustratively, the cutoff frequencies for both may be selected as 40 KHz, such that low pass filter 72 passes only signal frequencies below 40 KHz and high pass filter 70 passes only signal frequencies above 40 KHz.

Because of the limitation of frequency response of PZT 42, some manner of frequency limiting must be provided. One possibility is to replace high pass filter 70 with a band pass filter, passing only those frequencies above 40 KHz and below 200 KHz. However, a more effective and flexible solution is to program ROM 52 with the segmented, instantaneous values which will provide at PZT's 42 and 46, suitably apportioned between the two according to the spectral division, amplitudes of a substantially triangular waveform, wherein this waveform represents the sum of the terms of a Fourier series including only the fundamental frequency and the third, fifth, seventh and ninth harmonics.

As an alternative to a waveform comprising only the first five terms of the infinite Fourier series for a triangular waveform, there exist substantially triangular waveforms comprising only the fundamental frequency and the first four odd harmonics, which waveforms provide improved linearity in the middle regions of the up-ramps and down-ramps, while sacrificing the substantially triangular shape in the vicinity of the $\pi/2$ and $3\pi/2$ portions of the waveform. One may hypothesize a waveform having, for example, a trapezoidal shape, express it mathematically, typically in linear segments, and perform a Fourier analysis on the expression. This process will be continued, varying the waveshape and the resulting mathematical expression thereof, until negligibly small amplitude terms are realized for the harmonics above the ninth. At this time, the amplitudes of the fundamental frequency and third, fifth, seventh and ninth harmonics are recorded.

As a second alternative, one may synthesize a waveform using a harmonic synthesizer, adjusting the amplitudes of the fundamental frequency and third, fifth, seventh and ninth harmonics while observing the resultant waveform on an oscilloscope, until an acceptable waveshape is achieved. At this time, the five amplitudes are recorded.

For these alternative cases, waveform storage ROM 52 is programmed with a sequence of values which, when synthesized by A/D converter 54, spectrally split by splitter 56 so as to apply the fundamental frequency component to PZT 46 and the harmonic frequency components to PZT 42, provides deflections of mirrors 40 and 44 such that the amplitudes of the spectral components of the deflections are proportional to the recorded values of amplitude.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but should instead by gauged by the breadth of the claims which follow.

What is claimed is:

1. In a gas laser having a waveguide cavity, said cavity defined at the ends thereof by movable endpieces, an apparatus for modulating the optical length of said cavity, said apparatus comprising:
   first and second transducers coupled to said movable endpieces, said first and second transducers being responsive to electrical control signals for modulating the positions of said endpieces;
   means for generating a modulation signal; and
   means for separating said modulation signal into a first signal including fundamental frequency components greater than a first predetermined cutoff frequency and a second signal including harmonic frequency components less than a second predetermined cutoff frequency substantially equal to the first cutoff frequency, said first and second signals being coupled respectively to said first and second transducers.

2. The apparatus according to claim 1 wherein said movable endpieces comprise optical reflectors.

3. The apparatus according to claim 1 wherein said first and second transducers comprise piezoelectric transducers.

4. The apparatus according to claim 1 wherein said means for generating a modulation signal comprises:
   means for storing data relating to the waveshape of said modulation signal;
   means for sequencing said data out of said storing means; and
   means for converting said data sequenced out of said storing means into said modulation signal.

5. The apparatus according to claim 4 wherein said storing means comprises a read-only memory (ROM) having data stored therein at addressable locations, said data comprising a multiplicity of digital representations of instantaneous amplitudes of said modulation signal.

6. The apparatus according to claim 5 wherein said sequencing means comprises a controller for sequentially addressing said addressable locations of said storing means.

7. The apparatus according to claim 5 wherein said converting means comprises a digital-to-analog (D/A) converter responsive to said ROM data for generating a substantially continuous analog signal.

8. The apparatus according to claim 1 wherein said separating means comprises a high pass filter and a low pass filter, said filters being coupled at their input ports to said modulation signal.

9. The apparatus according to claim 8 further including a first amplifier coupled between said high pass filter and said first transducer, and a second amplifier coupled between said low pass filter and said second transducer.

10. The apparatus according to claim 9 wherein said first transducer has a higher bandwidth than said second transducer.

11. The apparatus according to claim 9 wherein said second transducer is more sensitive to an applied control signal for modulating the position of its corresponding endpiece than is said first transducer.

12. The apparatus according to claim 1 further including means coupled between said separating means and one of said first and second transducers for adjusting the relative phases of said first and second signals.

13. A waveguide laser comprising:
a sealed envelope including a waveguide cavity;
first and second electrodes adjacent said waveguide cavity;
means coupled to said first and second electrodes for producing an electrical discharge within said waveguide cavity;
a gain medium within said envelope for emitting coherent radiation in response to said electrical discharge between said electrodes;
first and second optical reflectors positioned at the respective ends of said waveguide cavity, said reflectors being movable so as to modulate the optical length of said cavity;
first and second transducers coupled, respectively, to said first and second reflectors, said first and second transducers being responsive to electrical control signals for modulating the positions of said reflectors;
means for generating a modulation signal; and
means for separating said modulation signal into a first signal including frequency components greater than a first predetermined cutoff frequency and a second signal including frequency components less than a second predetermined cutoff frequency substantially equal to the first cutoff frequency, said first and second signals being coupled respectively to said first and second transducers.

14. The laser according to claim 13 wherein said first and second transducers comprise piezoelectric transducers.

15. The laser to claim 13 wherein said means for generating a modulation signal comprises:
means for storing data relating to the waveshape of said modulation signal;
means for sequencing said data out of said storing means; and
means for converting said data sequenced out of said storing means into said modulation signal.

16. The laser according to claim 15 wherein said storing means comprises a read-only memory (ROM) having data stored therein at addressable locations, said data comprising a multiplicity of digital representations of instantaneous amplitudes of said modulation signal.

17. The laser according to claim 16 wherein said sequencing means comprises a controller for sequentially addressing said addressable locations of said storing means.

18. The laser according to claim 16 wherein said converting means comprises a digital-to-analog (D/A) converter responsive to said ROM data for generating a substantially continuous analog signal.

19. The laser according to claim 13 wherein said separating means comprises a high pass filter and a low pass filter, said filters being coupled at their input ports to said modulation signal.

20. The laser according to claim 19 further including a first amplifier coupled between said high pass filter and said first transducer, and a second amplifier coupled between said low pass filter and said second transducer.

21. The laser according to claim 19 wherein said first transducer has a higher bandwidth than said second transducer.

22. The laser according to claim 19 wherein said second transducer is more sensitive to an applied control signal for modulating the position of its corresponding endpiece than is said first transducer.

23. The laser according to claim 13 further including means coupled between said separating means and one of said first and second transducers for adjusting the relative phases of said first and second signals.

24. The laser according to claim 13 further including means responsive to the frequency of said coherent radiation and coupled to said second transducer for generating a tuning signal for tuning the optical length of said cavity.

25. The laser according to claim 24 further including means for combining said tuning signal and said second signal.

26. In a gas laser having a waveguide cavity, said cavity defined at the ends thereof by movable endpieces, a method for modulating the optical length of said cavity, said method comprising the steps of:
(a) providing first and second transducers coupled to said movable endpieces, said first and second transducers being responsive to electrical control signals for modulating the positions of said endpieces;
(b) generating a modulation signal;
(c) separating, said modulation signal into a first signal including frequency components greater than a first predetermined cutoff frequency and a second signal including frequency components less than a second predetermined cutoff frequency substantially equal to the first cutoff frequency; and
(d) coupling said first and second signals, respectively, to said first and second transducers.

* * * * *